(12) United States Patent
Srinivasan et al.

(10) Patent No.: US 8,078,928 B2
(45) Date of Patent: Dec. 13, 2011

(54) SYSTEM AND METHOD FOR VERIFYING THE TRANSMIT PATH OF AN INPUT/OUTPUT COMPONENT

(75) Inventors: Arvind Srinivasan, San Jose, CA (US); Rahoul Puri, Los Altos, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1096 days.

(21) Appl. No.: 11/974,413

(22) Filed: Oct. 12, 2007

(65) Prior Publication Data

US 2009/0100296 A1 Apr. 16, 2009

(51) Int. Cl.
*G06F 11/00* (2006.01)
(52) U.S. Cl. .......................................... 714/741; 703/14
(58) Field of Classification Search .................. 714/712, 714/715, 741; 703/14, 16
See application file for complete search history.

(56) References Cited

U.S. PATENT DOCUMENTS

| | | | |
|---|---|---|---|
| 6,345,242 B1 * | 2/2002 | Dearth et al. ................ | 703/22 |
| 6,560,572 B1 * | 5/2003 | Balaram et al. ............. | 703/22 |
| 7,020,716 B2 * | 3/2006 | Raval et al. ................. | 709/237 |
| 7,529,864 B2 * | 5/2009 | Kapoor et al. ............... | 710/22 |
| 7,653,843 B2 * | 1/2010 | Ryckebusch et al. ........ | 714/712 |
| 7,840,841 B2 * | 11/2010 | Huang et al. ................ | 714/25 |
| 7,865,789 B2 * | 1/2011 | Bueti et al. .................. | 714/724 |
| 2003/0135683 A1 * | 7/2003 | Moy ............................. | 710/305 |
| 2008/0086668 A1 * | 4/2008 | Jefferson et al. ............ | 714/741 |
| 2009/0100296 A1 * | 4/2009 | Srinivasan et al. .......... | 714/43 |
| 2009/0100297 A1 * | 4/2009 | Srinivasan et al. .......... | 714/43 |

\* cited by examiner

*Primary Examiner* — Joshua Lohn
(74) *Attorney, Agent, or Firm* — Park, Vaughan, Fleming & Dowler LLP

(57) ABSTRACT

A system and method for verifying the transmit path of an input/output device such as a network interface circuit. The device's operation with various different input sources (e.g., hosts, input buses) and output sources (e.g., output buses, networks) is modeled in a verification layer that employs multiple queues to simulate receipt of input data, submission to an output port and transmission from the device. Call backs are employed to signal completion of events related to receipt of data at the device and modeling of data processing within the verification layer. As call backs are resolved, corresponding tasks are executed to advance the processing of the data through the verification layer. A device-specific algorithm is executed in the verification layer to predict the ordering of output from the device, and that output is compared to the predicted output by a transmission checker.

12 Claims, 8 Drawing Sheets

SYSTEM AND METHOD FOR VERIFYING THE TRANSMIT PATH OF AN INPUT/OUTPUT COMPONENT

RELATED APPLICATIONS

This application is related to U.S. patent application Ser. No. 11/418,901, filed May 4, 2006 and entitled "Abstracted Host Bus Interface for Complex High Performance ASICs," which is incorporated herein by reference, and is also related to U.S. patent application Ser. No. 11/974,414 filed Oct. 12, 2007 and entitled "System and Method for Verifying the Receive Path of an Input/Output Component."

BACKGROUND

This invention relates to the field of computer systems. More particularly, a system and method are provided for verifying the transmission path of an input/output subsystem or component.

Before releasing a communication component or device, such as a network interface circuit, communication bus, disk controller, and so on, it is essential to verify its proper operation.

Traditionally, to test the operation of a communication component a set of predetermined inputs or stimuli would be applied to the component in a strict order and the output of the component would be examined, or hooks would be placed in the component being tested, to determine if it had processed the input in an expected manner.

For example, to test the transmit path of the component, a predetermined set of data having known attributes would be used as input, and would be designed to test just a small subset of the component's functionality. Different static sets of input would have to be used to test other functionality. To test the component's receive path, data rates into and out of the component would be matched to ensure that testing is not disturbed by data being dropped.

In both scenarios, the testing environments do not reflect actual operating environments. In live operation of an input/output component or device, it will almost certainly receive for transmission data patterns that have a far wider range of attributes than the predetermined static stimuli applied during verification. Further, communication data rates on one side of the component (e.g., between the component and a host) are unlikely to consistently closely match rates on the other side (e.g., between the component and a network other communication link). Thus, traditional verification environments and methods often fail to adequately test input/output components.

SUMMARY

In one embodiment of the invention, a system and methods are provided for verifying the transmit path of an input/output device such as a network interface circuit. The device's operation with various different input sources (e.g., hosts, input buses) and output sources (e.g., output buses, networks) is modeled in a verification layer that employs multiple queues to simulate receipt of input data, submission to an output port and transmission from the device. Call backs are employed to signal completion of events related to receipt of data at the device and modeling of data processing within the verification layer. As call backs are resolved, corresponding tasks are executed to advance the processing of the data through the verification layer. A device-specific algorithm is executed in the verification layer to predict the ordering of output from the device, and that output is compared to the predicted output by a transmission checker.

The verification environment allows for dynamic alteration of operating parameters and policies (e.g., DMA policies) without halting verification. Instead of maintaining a static repository of input or stimulus patterns, input (e.g., packets, packet attributes) is generated as needed based on the operative policy or policies. Thus, based on which feature or component of the device is to be tested (e.g., a particular DMA engine), input can be dynamically generated to target that specific feature or component, and both the device and the verification layer will process the input according to the operative policy.

DETAILED DESCRIPTION

Figure 1:
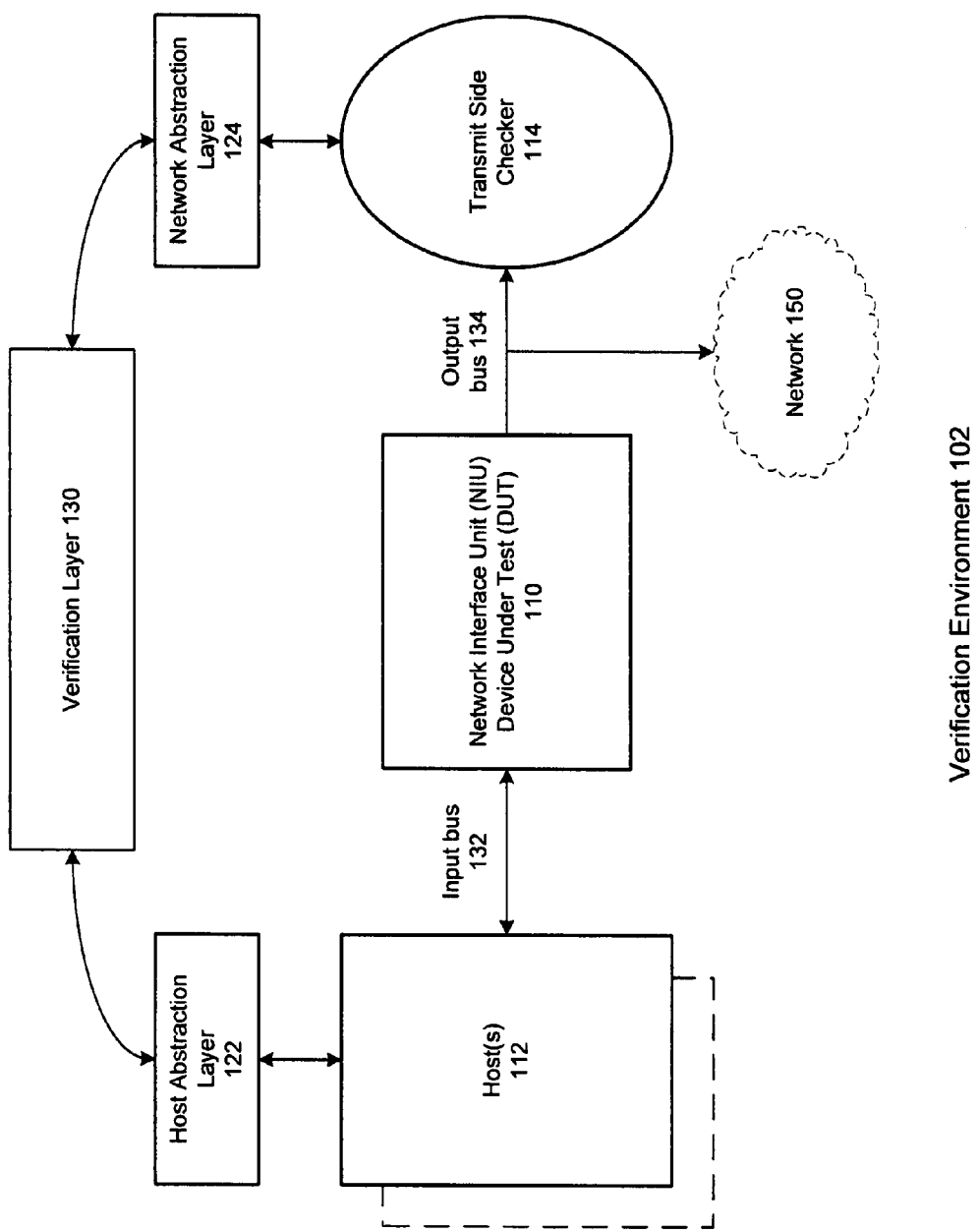
FIG. 1 is a block diagram depicting a verification environment for verifying the transmit path of a device in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, an end-to-end system level framework is provided for verifying correct operation of the transmission path of an input/output device or component. The framework allows input to the DUT or device under test (e.g., data to be transmitted through the device) to be random and unordered. The framework then predicts how the device will operate on the input according to one or more desired metrics, such as output order, data queuing, error checking, error handling, etc.

The framework can thus be coupled to different host and bus types, without having to employ static input or stimulus patterns for a particular host or bus. In particular, virtually any type of host (e.g., computer, input/output subsystem, other network node) can input random or operational data to the framework (and DUT) via various communication buses without modifying the framework for the particular host/bus configuration.

In another embodiment of the invention, an end-to-end system level framework is provided for verifying correct operation of the receive path of an input/output device or component. The framework allows input to the DUT or device under test (e.g., data to be relayed through the device to one or more hosts) to be random and unordered. The framework then predicts how the device will operate on the input according to one or more desired metrics, such as ordering, data queuing, error checking, error handling, etc.

The framework can be coupled to different types of links and entities without having to employ static input or stimulus patterns. In particular, virtually any type of input source (e.g., network, dedicated communication link) can input random or operational data to the framework (and DUT) via various communication paths (or models thereof) and in various protocols without modifying the framework for the particular communication configuration.

Embodiments of the invention described herein may be employed with an end-to-end system verification environment described in U.S. patent application Ser. No. 11/418,901, filed May 4, 2006 and entitled "Abstracted Host Bus Interface for Complex High Performance ASICs," which is incorporated herein by reference.

Verifying the Transmit Path of a DUT

In an embodiment of the invention, the transmit path of a device under test is modeled to provide an accurate prediction of a DUT's operation, from receipt of input (i.e., receipt of data to be transmitted) to the transmission of the processed input from the DUT (e.g., transmission of a packet). Various system conditions may be applied during modeling to simulate actual operational use of the DUT.

The DUT may receive its input directly from a host's memory or via a communication bus. The verification framework can operate with any of a variety of buses without knowing ahead of time which bus is in use, such as PCIe RC (Root Complex), PCIe bridge, PCIe multi-root, Hypertransport, SIU (System Interface Unit), and/or others, despite the great variation in communication protocols and attributes employed by the various bus types.

For example, depending on the types of host and bus coupled to the DUT to provide input, the framework may automatically accommodate and model varying operating parameters imposed by the connected host and/or bus, such as different latencies, receipt of data in order or out of order, different data segmentation schemes, error types and frequencies, different software programming modes, and so on. Regardless of these operating parameters, the framework is able to predict data ordering all the way from the host through to the output of the DUT, or model some other aspect of the DUT (e.g., error handling).

FIG. 1 depicts a verification environment for modeling and verifying operation of a device's transmission path, according to one embodiment of the invention. In verification environment 102, device under test (DUT) 110 is designed to receive and process input from host(s) 112, and transmit communications (e.g., packets, cells) on network 150 or some other communication link.

Verification layer 130 models the behavior of DUT 110 and communicates with transmit side checker 114 to help determine whether the actual behavior of the DUT comports with the expected behavior. The verification environment may be implemented with various hosts and input buses/links 132, with host abstraction layer 122 interfacing between the verification layer and the operative host(s) and input bus(es). Similarly, the DUT may be coupled to any of various types of networks and/or other output buses 134, and network abstraction layer 124 interfaces the verification layer to the transmit side checker corresponding to the outgoing communication link(s). U.S. patent application Ser. No. 11/418,901 describes illustrative implementations of the network abstraction layers.

Illustrative input buses that may be employed or modeled within verification environment 102 include any of the various flavors of PCIe (e.g., Bridge, Multi-Root), HT (HyperTransport), SIU (System Interface Unit)), a communication or data network, and so on, while the output bus or link may comply with various network topologies (e.g., Ethernet, InfiniBand), operating speeds, media type (e.g., SERDES, copper), etc.

The dynamic nature of the verification environment allows it to accept and model random or pseudo-random input reflective of data that would be received during live operation of the device. In particular, the input need not be pre-determined and may be adjusted or altered on-the-fly as desired.

Input from any number of hosts and/or data streams may be modeled. For example, in one implementation, up to 4 hosts may be active, with up to 8 data streams being issued from each host. In general, the verification framework can operate with M hosts and accept up to N data streams from each host, with M and N being positive integers $\geq 1$. Host may constitute separate network entities (e.g., one may be a computer server while another is a disk array) or may comprise separate components (e.g., CPUs) within a single physical machine.

In the embodiment of FIG. 1, DUT 110 is the programming of an Integrated Circuit (e.g., of a network interface circuit), illustratively coded in Verilog. The verification layer is written in VERA, but could alternatively be written in a different language, such as RTL (Register Transfer Logic), VHDL, Verilog and so on. Alternatively, DUT 110 may be the actual device on which the programming normally runs (e.g., the network interface circuit). Hosts 112 and input bus 132 may include physical entities (e.g., a computer, an I/O subsystem, a network, a network link, a host bus) or software models of physical entities.

During modeling, the verification layer can do more than simply verify that data received from the host(s) was output to the network. It can also check the ordering of the transmitted packets, determine whether a packet was dropped, identify a dropped packet, and determine why it was dropped. Although implementations of this embodiment of the invention are described herein as they may be used to verify the ordering of output from the DUT, one skilled in the art will understand how these implementations may be modified to verify correct handling of errors (e.g., out of order input, overflow, corrupted data), allocation of transmission bandwidth between ports or data streams, rate limiting, reordering, and so on.

Embodiments of the invention employ multiple types and levels of queues, which can be dynamically allocated and de-allocated based on operation of the verification framework and the input.

Figure 2:
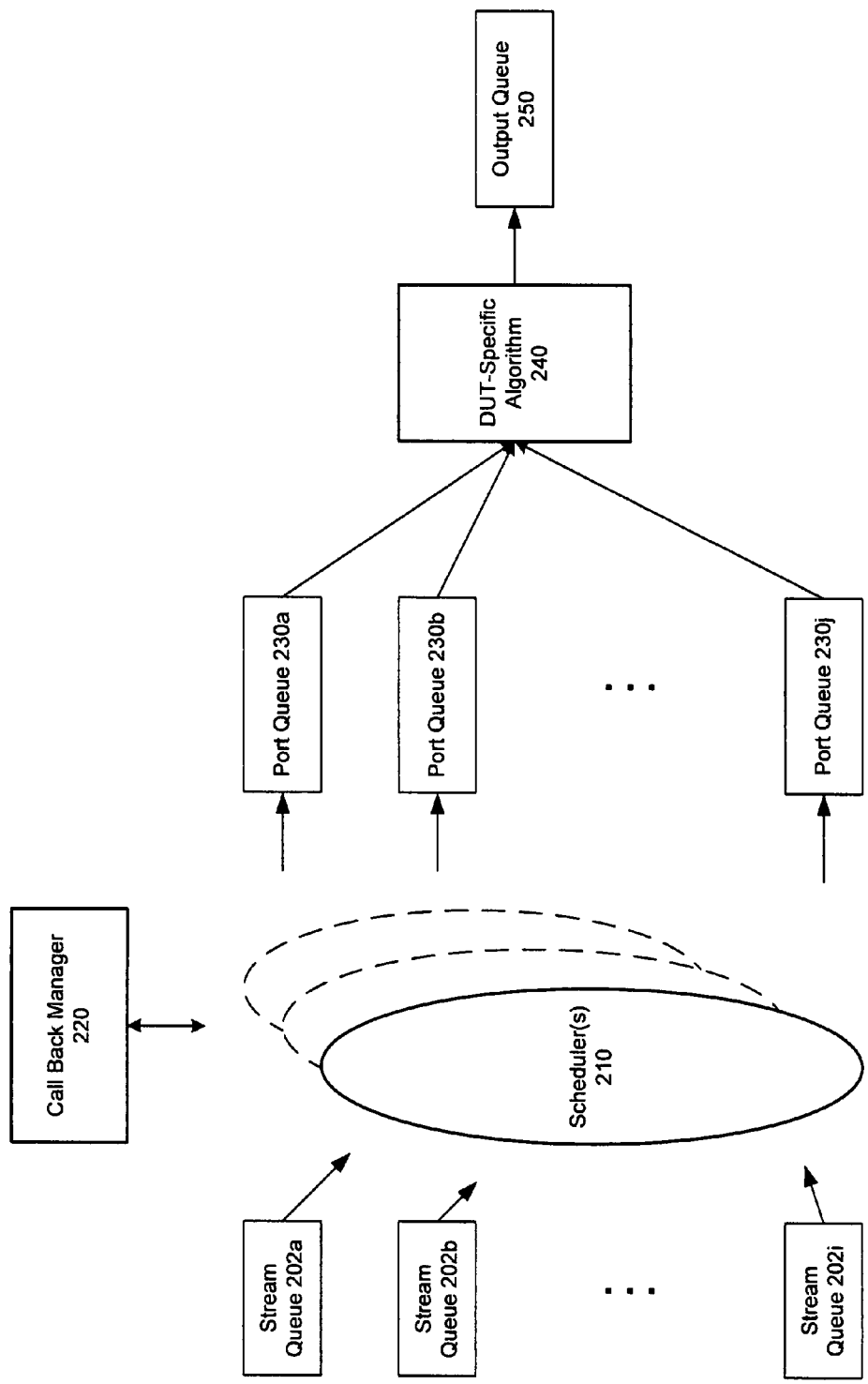
FIG. 2 is a block diagram of a verification layer for verifying the transmit path of a device in accordance with an embodiment of the invention.

FIG. 2 is a block diagram of verification layer 130 of FIG. 1, according to one embodiment of the invention, and illustrates some of the queues that may be utilized.

Up to M×N (M hosts×N streams per host) stream queues 202 are served by schedulers 210 (e.g., DMA schedulers). Each scheduler populates a port queue 230 for its corresponding output port, and all port queues are serviced by DUT-specific algorithm 240, which populates output queue 250 to model transmission from the DUT.

Illustratively, each output port of the DUT is served by a separate scheduler or set of schedulers. For example, for each port, one scheduler may read from the stream queues that are destined for the port, while a cooperating scheduler for the same port populates the corresponding port queue. As described below, however, call backs are used to signal the movement of data between queues and therefore the scheduling of input data for a port queue is limited by call back manager 220.

Stream queues 202 in the illustrated embodiment of the invention are populated based on software programming, and are emptied upon software reset. Illustratively, as data is submitted to the DUT for processing and transmission, the same data (or attributes of the data) is placed in the appropriate stream queue. Stream queues 202 may be populated randomly, or the verification layer may request a host or hosts to submit data through any number of queues, and may be submitted error-free and in order, or with virtually any type of error. The verification layer may purposefully and dynamically inject an error into otherwise uncorrupted input data, reorder data within a queue, drop data or take other action to simulate a particular operating condition or problem.

Port queues 230 aggregate all stream queues bound to a single port, and feed the DUT-specific algorithm for modeling transmission from the DUT. Output queue 250 models the operative egress port of the DUT, and is dequeued by a checker (e.g., transmit side checker 114 of FIG. 1).

In one embodiment of the invention port queues 230 and output queue 250 are populated with tokens representing the data or communications (e.g., packets) that are processed by the device under test. Tokens placed in a port queue contain sufficient information to allow algorithm 240 to accurately model the DUT as it populates output queue 250. Tokens placed in output queue 250 contain sufficient information to allow the checker to compare the token with the corresponding packet (or other communication) produced by the DUT.

The stream queues, port queues and output queue are dynamic, in that entries (e.g., data, tokens) may be inserted or removed at any position, and may be modified at any time before being output from the queue. Because these queues are so dynamic, they may be considered to operate as Random In, First Out queues.

The verification layer uses "call backs" for event notification, to spur further processing within the layer, particularly the movement of data/tokens into and through the queues. In the embodiment of the invention depicted in FIG. 2, call backs may be used to signal actions including, but not limited to: receipt by a host of a read request or write request having a particular set of attributes, issuance from a host of a write response or read response having a particular set of attributes, completion of a successful PIO (Programmed I/O) by a host, checking whether a stream queue is empty, injection of an error into a packet, error handling behavior, error retransmission, ordering rules, bandwidth allocation/sharing, quality of service, rate limiting, host latency, MTU (Maximum Transfer Unit) sensitivity on bandwidth, and so on.

In this embodiment of the invention, a call back may be set for virtually any event outside of or at a boundary of the DUT, to reflect the dynamic nature of the DUT's operating environment and the processing of random data. No hooks are placed into the DUT itself.

In one implementation, each port of the DUT has a separate call back manager (e.g., call back manager 220 of FIG. 2), which communicates with the schedulers 210 that read from one or more stream queues and place tokens into the corresponding port queue.

A call back manager manages a dynamic queue of call backs, each entry comprising an event id that uniquely identifies the call back and one or more pointers to functions or tasks to be executed when the event associated with the call back occurs. Call backs can be dynamically added and removed from the queue, at any position. When all functions associated with a call back have been completed, the entry is deleted from the queue.

Illustrative functions or tasks that may be initiated when a call back is resolved include placing a token into a port queue, dynamically removing a token from a port queue or output queue, altering an attribute of a token, creating or resolving another call back, etc.

During modeling of a DUT, as events are initiated or requested, call backs for the events are queued by a call back manager. When a call back is resolved (i.e., the corresponding event is completed), the functions or tasks associated with the call back are executed.

For example, when data to be transmitted from the DUT is requested or received from a host, a call back is created to monitor the tasks that must be completed before the data can be passed to a port queue and the output queue. When all functions or tasks associated with a call back are completed, the data can then be moved to the next queue within the verification layer.

A call back may be dynamically deleted or repositioned within a call back queue, based on the event or a notification associated with that call back or some other call back. For example, a single read request may be issued to a host, but the host may return segmented data responses and the responses may be received out of order or with some other error. The original call back corresponding to the read request, which would have been resolved with receipt of a single error-free data response, may in this case spawn multiple other call backs (for the individual data segments) that must be resolved before the original call back. Any of the segments could be received with an error, which could require the entire data package to be marked for an error.

Call backs need not be set for every data request or data response, but may be. For example, if the verification layer requests 1K data from a host, but only 256 bytes can be transferred at a time, thereby requiring four separate data requests, then a single call back may be placed on the last request instead of all four.

However, if it is likely or possible that the four sets of requested data will be received out of order, call backs may be set for all of the requests. Illustratively, call backs associated with the first 3 requests may simply be configured to check the data for errors, while the final call back may also be configured to move the data forward through the verification layer if there are no errors.

To accurately model the DUT, recognition of an error in a packet or data input may cause the data to be dropped, may initiate error correction, may cause an input queue to be torn down, etc.

Call backs may be configured to operate at the periphery of the DUT, at the host level or even above the host level, as opposed to traditional notification schemes that were based solely on operations within the DUT—using hooks or other means. In the embodiment of the invention depicted in FIG. 2, no hooks are placed into the DUT. Instead, the DUT is verified by placing call backs in front of (or at the edge of) the DUT, accurately modeling its processing and comparing its output to what was expected.

During modeling, data input to the verification layer via a stream queue may change. For example, attributes of the data may be altered to simulate an error in the input. In this event, the corresponding call back may be deleted from the call back queue and a new call back reflecting the modified attributes may be inserted in the queue, in the same position if warranted.

DUT-specific algorithm 240 of FIG. 2 is responsible for modeling the ordering of output by the DUT, based on which input streams are active. The algorithm is notified, through call backs and/or the token messages placed in the port queue, which stream queues have data ready for processing. The algorithm then mimics the DUT's processing (e.g., round robin, priority) to anticipate the order with which the data will be transmitted.

The dynamic nature of the verification framework allows the contents of the output queue (and/or other queues) to be reordered as necessary. For example, if it is observed that a particular input queue of the DUT is so congested as to cause delays and/or dropped data, the verification layer will realize that an earlier packet or set of data that it had modeled as already being processed through the DUT has, in fact, not yet been processed. The corresponding entry in the output queue can therefore be removed or repositioned to more accurately reflect operation of the DUT.

The algorithm may be configured to model the DUT's processing in complementary fashion. For example, if the DUT is coded to use positive arithmetic, the algorithm may be coded using negative arithmetic to avoid repetition of any particular error that may have been made in the DUT's code.

Figure 3A:
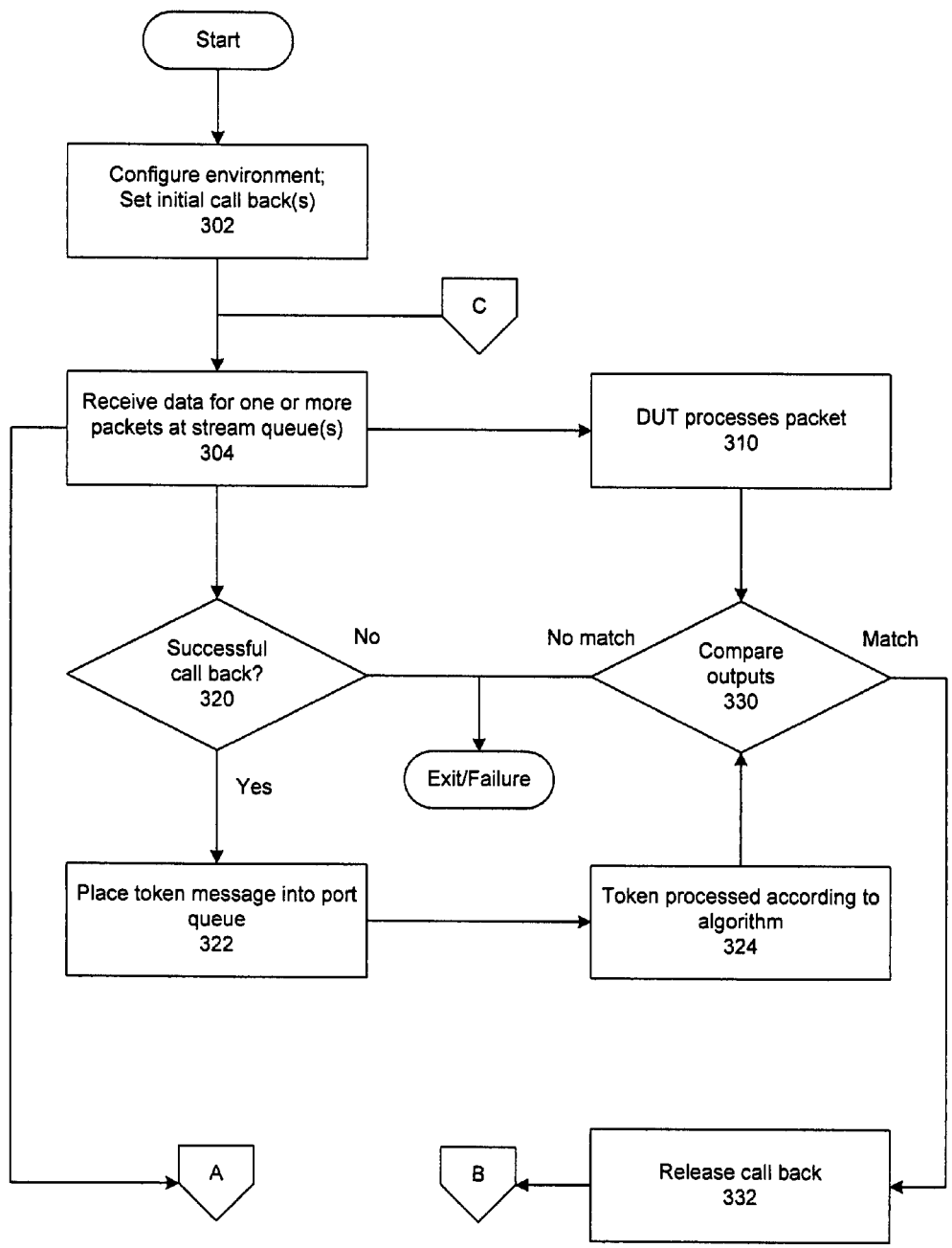
FIGS. 3A-B comprise a flowchart illustrating one method of using call backs to verify operation of the transmit path of a device in accordance with an embodiment of the invention.
Figure 3B:
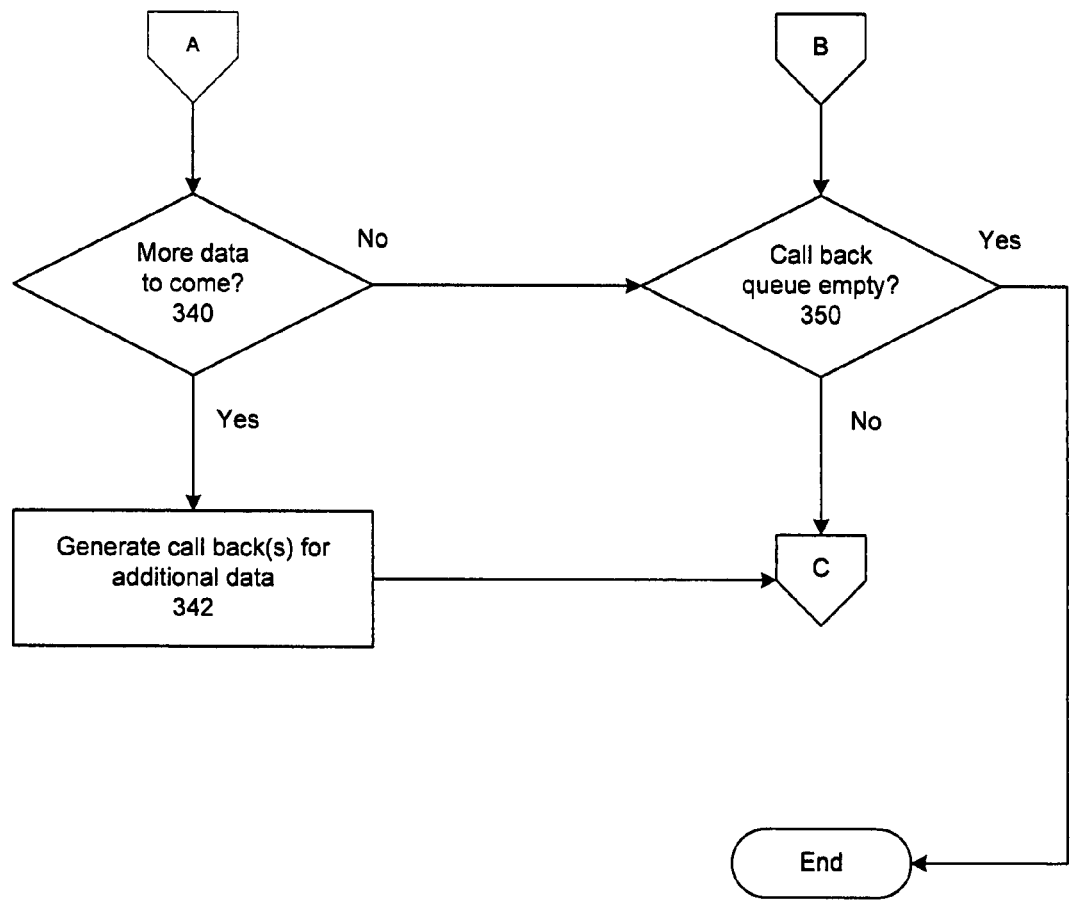

FIGS. 3A-B comprise a flow chart demonstrating a method of verifying the transmit path of an input/output component, according to one embodiment of the invention. In this embodiment, verification may focus on ensuring that the DUT correctly orders its output. In other embodiments, verification may also, or instead, focus on verifying other aspects of the DUT (e.g., bandwidth allocation, error recognition).

In operation 302, the verification environment is configured with a model of the DUT and the verification layer is coupled to one or more hosts or host models. The verification layer is configured with an output queue, port queues for each output port and any number of stream queues for receiving data from the host(s).

An initial set of data is requested from any number of the hosts. For example, if only one port of the DUT is to be tested, data may only be requested for hosts that would use that port. If multiple ports are to be tested, then data may be requested all of them.

In addition, an initial set of call backs is generated to cover the initial set of data. Illustratively, the configuration of the verification environment makes it possible to determine where the initial data will be stored, and so the initial call backs may be set to monitor those memory areas. A call back may time out if it is not resolved within a given period of time so that if a data request or response is lost or unrecognizable, the model can identify the error.

Also as part of the configuration process, an initial policy or set of policies (e.g., DMA policies) for operating the DUT is implemented in the DUT and modeled in the verification layer. One or more call backs may be issued and monitored to ensure the policy is in place.

Other call backs may be configured to generate notifications when a host receives one of the data requests, when a host responds to a data request, etc. For example, one or more other call backs may be placed to monitor other memory locations. This enables notification of an error situation in which data is stored at an incorrect area.

In operation 304, verification begins and data for an outgoing packet is received at a stream queue and the DUT model. Attributes of the data (e.g., packet type, length, output port, stream source) may have been specified in the data request that caused the data to be sent, or may be independently set by the issuing host or data generator. Because the stream queues are dynamic, an entry may be deleted and re-inserted at any point in the queue. For example, if the software changes an attribute of the data (e.g., to inject an error), the data may be updated accordingly and the data re-queued.

When data is received, multiple actions occur in parallel in the DUT and the verification layer, represented by operations 310, 320 and 340.

In operation 310, the DUT receives and processes the data from the host(s). After operation 310, the illustrated method of the invention advances to operation 330.

In operation 320, a call back is triggered when the data is stored, and one or more tasks associated with the call back are then executed, which may initiate error-checking of the data, termination of the stream queue, etc.

Subsequent action depends on whether the call back was a successful one. In particular, if the call back was an expected call back (e.g., the received data was stored at an expected memory location), the method continues with operation 322. However, if the call back amounts to a notification of an error situation (e.g., a call back timed out, data was stored in an unexpected memory location), then the verification may exit with an error. In different implementations, verification may fail after one error, or only after multiple errors accumulate.

In operation 322, one task performed after successful receipt of the data is the creation of a token message for placement in the appropriate port queue. The token message describes the data, including any or all of its attributes (e.g., stream id, port id, order of precedence within DUT, is checksum enabled, is CRC enabled). The token may also reflect whether the packet was generated before or after introduction of an error in its stream, and whether that error was a true error or was a forced error injected by the verification layer.

In operation 324, the port queue is serviced according to the operative algorithm and the token message is processed and forwarded to the output queue to simulate transmission of the packet from the DUT.

In operation 330, the output of the DUT is compared with the corresponding token from the output queue to determine whether the DUT treated the packet in the same way as the verification layer.

In operation 332, the output of the DUT and the verification layer match, and the verification layer can now release the call back(s) associated with the data. Because a limited number of call backs may be permitted to be in flight at one time, this may be necessary to allow additional call backs to be generated (e.g., for subsequent data). After operation 332, the method advances to operation 350.

In operation 340, the verification layer determines whether additional data is to be received from the host(s). If verification is to continue and more data is expected, the method continues with operation 342. Otherwise, if the recently received data is the last to be received, the method advances to operation 350.

In operation 342, one or more call backs are generated in association with additional data. For example, as with the initial set of call backs, the new call backs may be configured to monitor memory locations at which the additional data is expected to be stored or read from. After operation 342, this branch of illustrated method of the invention returns to operation 304.

In operation 350, the verification layer determines whether its call back queue is empty. If the queue is empty, then all call backs associated with expected data (and any other monitored events) have been resolved.

If the queue is not empty, then the method returns to operation 304 to await additional data. If the queue is empty, verification can end successfully.

In the illustrated method of the invention, the policy or policies governing operation of the DUT (e.g., to determine how each set of packet data should be handled) are dynamic. In particular, a policy may be dynamically altered or replaced during verification without restarting the verification process. As described in the following section, verification of the transmit and/or receive path may continue as the new or replacement policy is propagated through the DUT and the verification layer.

Verifying the Receive Path of a DUT

In an embodiment of the invention, the receive path of an input/output device under test is modeled to provide an accurate prediction of the DUT's operation, from receipt of data from a network or other communication link to the dissemination of the received data to one or more hosts or data streams (e.g., any of M hosts and N data streams, where M and N≧1). Various system conditions may be applied during modeling to simulate actual operational use of the DUT, and the verification framework helps ensure that the data reaches its correct destination. The treatment of errors can be predicted not only at the physical layer, but at higher layers.

Implementations of this embodiment of the invention are able to accurately model DUT operations with mismatched input and output data rates. For example, an inbound data link (e.g., from a network) to an input/output component such as a network interface circuit sometimes operates at a higher or lower rate than a data link from the component to the host for which the inbound data is destined.

Because all data received at the component or DUT must be accounted for, present implementations of the verification framework will model the dropping of excess inbound communications and may even determine which particular communications will be dropped by the DUT. Traditional verification frameworks cannot do this and typically require the use of matching inbound and outbound communication rates.

As with modeling of the transmit path, the verification layer of the environment is abstracted from the input source (e.g., network) and output destination (e.g., host or host bus), which may therefore be of various types without modifying the verification layer. The verification layer is configured with different types of dynamic queues for processing tokens corresponding to the packets processed by the DUT, and call backs or other forms of event notifications may be used to facilitate the modeling.

One way in which callbacks may be used in the receive direction is to verify where incoming packet data was stored by the DUT. For example, when a packet is received from the network or other input source (e.g., at a queue associated with an ingress port of the DUT), the verification layer predicts which DMA engine will be used by the DUT to transfer the packet's contents to the host. A callback may be placed on the memory addresses that the selected engine would write to and, when a write is detected to that address range, the data that is written can be compared to the received packet.

In practice, call backs may be maintained for all memory areas the DMA engines may write to, so that whenever something is transferred to the host the verification layer is notified. When the verification layer models receipt of a packet by the DUT from the network, if no call back is received within some given time period after the packet should have been transferred to the host, it may be assumed that the packet was dropped, that it was written to an incorrect address or that some other error occurred.

In one embodiment of the invention, specific call backs may be placed to trigger notifications of particular events (e.g., writing packet data to a specified portion of host memory), but additional "null" call backs may also be established to trigger notification of events other than those associated with specific call backs. Thus, if data is written to a range of host memory outside of expected ranges, the triggering of a null call back may signal an error in the DUT.

Call backs may be chained to test multiple DUT functions or multiple DUTs. For example, if all packet data successfully transferred to one entity (e.g., a bridge or router, or a model of a bridge or router) should be transferred elsewhere (e.g., toward another host), a call back may be placed after the first entity to verify successful transfer.

Figure 4:
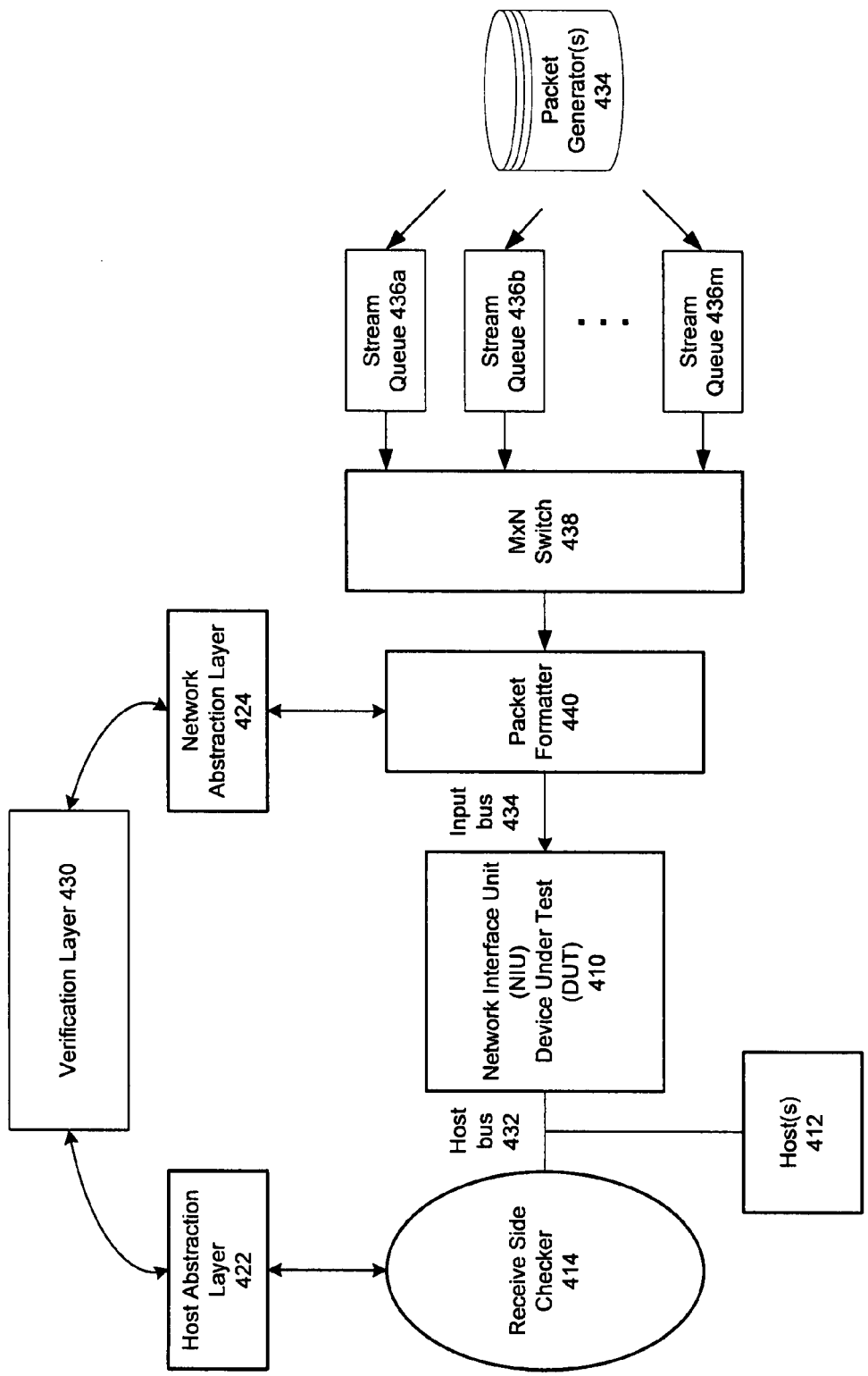
FIG. 4 is a block diagram depicting a verification environment for verifying the receive path of a device in accordance with an embodiment of the present invention.

FIG. 4 is a block diagram of a verification environment in which the receive path of an input/output component or device under test may be verified, according to one embodiment of the invention. Verification environment 402 of FIG. 4 may co-exist with environment 102 of FIG. 1.

In FIG. 4, packet generator(s) 434 store or generate attributes of packets to be fed to DUT 410 and verification layer 430. Packet attributes may indicate characteristics such as packet size, type, origination or destination address, origination or destination port number, whether checksum or CRC is enabled, etc. Each time a packet is to be submitted for verification, the generator may select a set of attributes randomly or according to some policy (e.g., to test a particular ingress port of the DUT, to test a particular DMA engine, to simulate a particular type of traffic). In one alternative implementation, packet generator 434 may store or generate complete packet headers or even entire packets.

Packet generator 434 populates stream queues 436 with the attributes it selects. Illustratively, each stream queue 436 corresponds to a data stream to be modeled through the DUT. Any number of stream queues may be active at any time, up to M (where M≧1).

From stream queues 436, each packet's attributes are fed to M×N switch 438, which transfers the attributes from the M stream queues to packet formatter 440 for creation of a packet to be input to one of N ports of DUT 410 (and N corresponding port queues of verification layer 430).

If a destination port was not specified by packet generator 434 (e.g., as a packet attribute), then either switch 438 or packet formatter 440 selects one based on the current DMA policy being enforced within the DUT and verification layer. In one implementation attributes for layer 3 and higher of a communication protocol are specified by packet generator 434, while lower level attributes (e.g., destination port numbers) are selected by the switch.

Packet formatter 440 generates an appropriately configured packet for the DUT, based on the received packet attributes and the operative network protocol. The packet formatter may be configured to inject random or predetermined errors into packets, as desired. The packets are then submitted to the DUT as if they were just received from the modeled network. The packets, or possibly just the packets' attributes, are also delivered to verification layer 430.

The output of DUT 410 is passed to receive side checker 414, for comparison with the output predicted by verification layer 430. Various types of hosts and input networks may be modeled and tested with the DUT; in the illustrated embodiment of the invention, abstraction layers 422, 424 allow the verification layer to function with the different types without modification. Similarly, verification layer 430 need not know the particulars of host bus 432 or input bus 434, which may be actual buses or may be modeled. In one implementation, packet formatter 440 may include some or all of the functionality of network abstraction layer 424.

Figure 5:
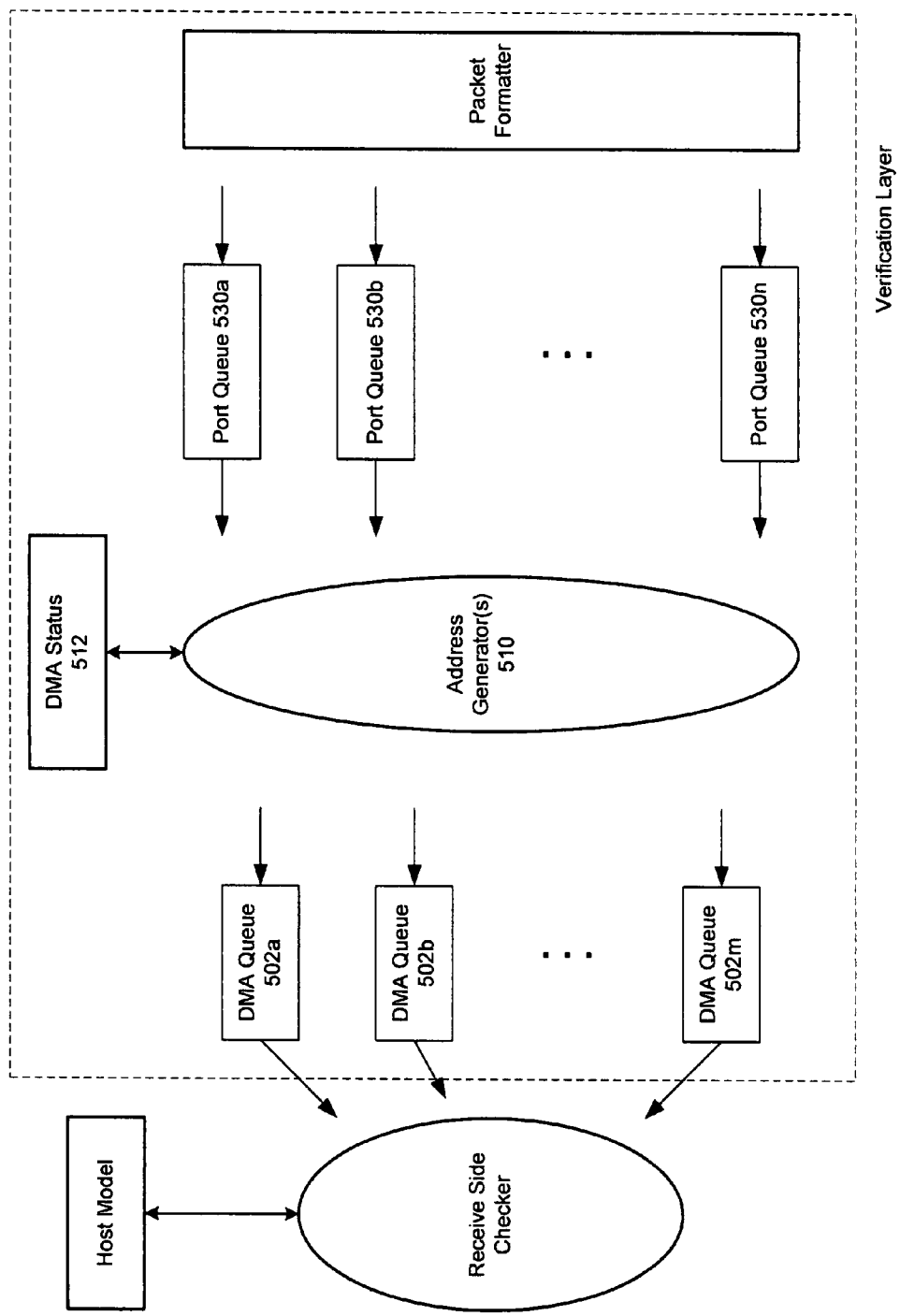
FIG. 5 is a block diagram of a verification layer for verifying the receive path of a device in accordance with an embodiment of the invention.

FIG. 5 is a block diagram of verification layer 430 of FIG. 4, according to one embodiment of the invention. The verification layer models the receive path of the DUT to determine how incoming packets should be processed, and determines whether a packet would be dropped, which DMA engine will handle the packet, where it will be stored in host memory, etc. Thus, if the verification layer knows that a DMA engine of the DUT only has sufficient descriptors or buffer space to store ten packets, any additional packets received before those packets are transferred to the host will be dropped to mimic the DUT's behavior.

As with transmit path verification, call backs are used to monitor data flow. For example, a call back may be placed on host memory areas to determine when a packet has been transferred from the DUT. Because any of multiple hosts (or host models) and host buses may be in use during verification, the verification layer cannot predict the timing of interactions between the host and the DUT.

In FIG. 5, as packet attributes (or entire packets) are received at the verification layer from the packet formatter (e.g., packet formatter 440 of FIG. 4), they are stored in port queues 530. In one implementation the packet formatter places token messages in the port queues, to describe the packets' attributes. Separate port queues are maintained for each of the N ports of the DUT (N≧1).

Address generator 510 determines which DMA queue would receive each corresponding packet within the DUT, based on its attributes and the DUT's policies, and also determines whether a packet would likely be dropped (e.g., because its DMA queue in the DUT is full), based on statuses 512 of the DMAs.

DMA status 512 comprises a set of shadow DMA caches that mimic the DUT DMA caches, and indicates when a DMA is active or inactive, whether the DMA can accept a packet, etc.

The verification layer may set call backs on any or all packet transfers from the DUT to the host or host model. This allows the verification layer to accurately track the DUT's operation during periods of uncertain data exchange. For example, the verification layer can predict when a DUT DMA will be unable to accept more packets from the network, and may set a negative call back to ensure such packets are not transferred to the host.

When additional descriptors or buffers are posted for the DMA's use there will be some period of uncertainty as to when the DUT will actually be able to start using them. Using call backs allows the verification layer to determine precisely when the DMA resumes data transfers, and can dynamically update its queues accordingly to reflect which packets were or were not dropped.

If a DMA policy is altered or replaced during verification to modify which DMAs are used for particular types of packets, the changes are reflected in DMA status 512. The packet generator(s) are updated to use the new policy when issuing packet attributes, and address generator 510 is updated to apply the new policy when selecting a DMA queue. Any number of existing packets may be processed under the old policy before the new one is fully implemented.

Because packets continue to flow through the verification environment while the policy is updated, various queues and queue contents may be modified. For example packet attributes may be updated in stream queues 436, or moved from one stream queue to another, tokens may be modified or moved between port queues 530 and/or DMA queues 502.

Figure 6A:
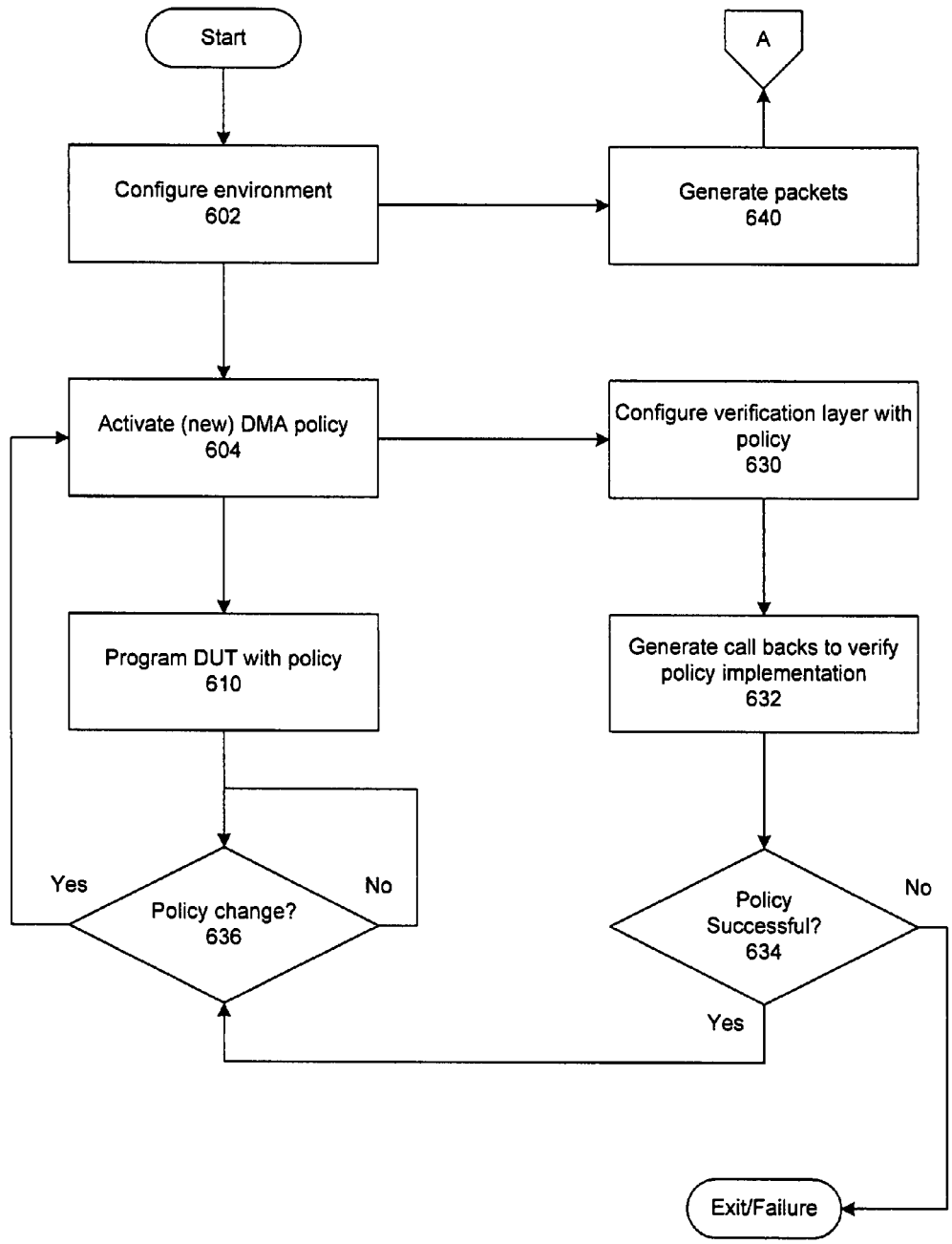
FIGS. 6A-B comprise a flowchart illustrating one method of using call backs to verify operation of the receive path of a device in accordance with an embodiment of the invention.
Figure 6B:
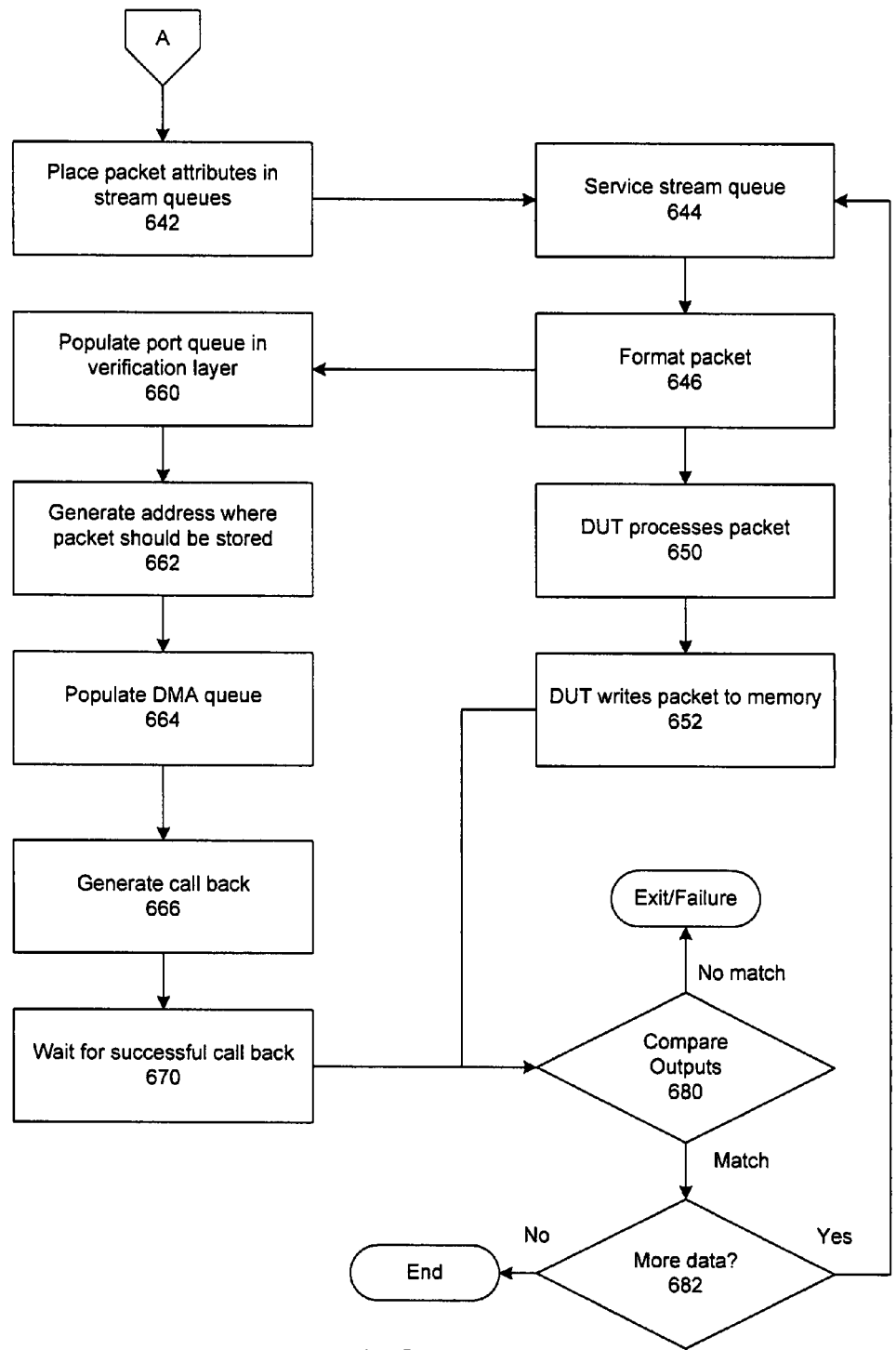

FIGS. 6A-B comprise a flow chart demonstrating a method of verifying the receive path of a device according to one embodiment of the invention. In this embodiment, verification may focus on ensuring that the DUT correctly separates and stores its packet input for the different consumers (e.g., hosts). In other embodiments, verification may also, or instead, focus on verifying other aspects of the DUT (e.g., error recognition).

In operation 602, the verification environment is configured with a model of the DUT and the verification layer is coupled to one or more networks or other communication links. The environment is configured with any number of stream queues for receiving data (or attributes representing data) from the networks or other sources, which will feed the input to the DUT and the verification layer. Within the verification layer, port queues corresponding to the DUT's input ports are configured, as well as DMA queues corresponding to the DUT's DMA engines.

In operation 604 an initial or replacement policy for handling packets is selected or configured. In particular, a DMA policy is configured to dictate how packets should be processed within the DUT (and the verification layer), including which DMAs should handle different types of packet.

To reflect real-world operation of the device, DMA policies are not static and therefore may change during verification. For example, as destination applications or services operating on hosts appear and disappear, or as a destination's quality of service or precedence is altered, operation of the DUT's DMA's changes accordingly and the verification layer's DMA policies will therefore also change.

In operation 610, the DUT is programmed with the selected (initial or replacement) DMA policy. After operation 610, the method advances to operation 636.

In operation 630, the verification layer is configured with the same DMA policy, to accurately mimic operation of the DUT.

In operation 632, call backs are configured to track successful implementation of the new DMA policy within the verification layer. Each time a policy changes, one or more additional call backs will be generated to determine when it is in place. Illustratively, when a new policy is disseminated, some packets received earlier will still need to be handled according to the previous policy. The call backs related to policy implementation may be configured to signal when the new policy is actually put into effect (e.g., for the first packet received after the policy's dissemination).

In operation 634, it is determined at some point (e.g., after verification commences) whether the policy has been successfully implemented. For example, when an updated or replacement policy is implemented, if the policy is not successfully implemented within some period of time, the verification process may fail with an error.

If the current DMA policy is implemented successfully, in operation 636 the verification layer constantly looks for a new or replacement policy. If and when a new policy is to be applied, the illustrated method of the invention returns to operation 604.

In operation 640, generation of packets or packet attributes commences. In this embodiment of the implementation, a packet generator is employed to generate packet attributes based on a given (or random) set of possible attributes. Generation may commence when the verification environment is initialized (e.g., with random packet attributes), or may wait until a policy is specified for selecting attributes.

In operation 642, stream queues are populated with the generated packet attributes based on the operative policy or policies. Elements 640-642 of FIGS. 6A-B demonstrate the generation and queuing of multiple sets of packet attributes for verification, and may be performed regularly or even continuously as packets are dequeued and processed as described below.

In operation 644, the M stream queues are serviced by a switch, multiplexer or other component, to feed the N ports of the DUT and the N corresponding port queues of the verification layer. The switch forwards each packet or set of packet attributes based on the operative DMA policy or policies.

In operation 646, a set of packet attributes extracted from a stream queue is formatted according to the network or communication link being modeled and the specified attributes (e.g., whether CRC is enabled, whether a checksum is computed, protocol options). Different protocols may therefore be enforced during different verification evolutions. The formatted packet is then dispatched in parallel to the DUT and the verification layer, although the verification layer may receive just the packet attributes or a token describing the attributes. In the illustrated embodiment of the invention, the packet formatter embodies a network abstraction layer and can therefore apply any desired protocol formatting or encapsulation.

In operation 650, the packet is transferred into the DUT and processed. The DUT port at which it is received is determined by the operative policy.

In operation 652, the DUT writes the packet data to host memory. After operation 652, the method advances to operation 680.

In operation 660, within the verification layer, attributes of the packet are used to generate and place a token into a port queue corresponding to the DUT port to which the packet was delivered to the DUT in operation 650.

In operation 662, the host address to which the DUT is expected to deliver the packet is computed. In the illustrated embodiment of the invention, one address generator may be implemented for each active DMA. The address generator used to calculate an address is thus determined by the DMA responsible for the packet, which depends on the operative DMA policy.

The responsible DMA model within the verification layer (and the corresponding DUT DMA) may be active or inactive at this point. The DMA may have encountered an error, may be out of buffers or descriptors, etc. For this reason the DMA statuses are continually monitored to allow an accurate prediction of where the packet will be stored.

In operation 664, the token is placed into the appropriate DMA's queue, for comparison by the checker with the output of the DUT.

In operation 666, one or more call backs configured to monitor the packet's expected destination address are generated. The call backs may be configured for different service methods, and so one may be configured to look for an associated interrupt, while another may be configured to look for a memory write or some other action (e.g., polling).

The type or types of call backs to generate may be based on the current DMA's status. For example, if the DMA is inactive because of an error, there may be no need for a call back configured to look for a memory write because the DMA will not be able to perform the write. A negative call back may also be generated, to determine if a packet is written to an incorrect memory location.

As described above, operations 640-666 may occur repeatedly, as long as verification is to continue and as long as there are additional sets of packet attributes to generate and process.

In operation 670, receipt of a successful call back is awaited. Any negative or unexpected call backs (e.g., associated with the storage of a packet at an incorrect address) may lead to immediate failure of the verification (or multiple errors may be accumulated before failure).

Upon receipt of a successful call back, in operation 680 the corresponding token output from a DMA queue within the verification layer is compared with the contents of the corresponding packet written to host memory by the DUT. If the comparison fails, the verification may exit with an error (or multiple errors may be accumulated before failure).

If the comparison succeeds, in operation 682 it is determined whether any more verification is required. For example, if any of the queues (e.g., stream, port, DMA) are not empty, the method returns to operation 644 to extract another packet from a stream queue. However, if the verification is complete, then the method exits.

Operations 644-682 may be performed in parallel for multiple packets, so that processing of one packet need not await completion of processing of the previous.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof.

In particular, methods described herein may be implemented using data structures and program code residing on a suitable computer-readable medium, which may be any device or medium that can store data and/or code for use by a computer system. This includes, but is not limited to, volatile memory, non-volatile memory, magnetic and optical storage devices such as disk drives, magnetic tapes, CDs (compact discs), DVDs (digital versatile discs or digital video discs), or other media capable of storing computer-readable media now known or later developed.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A verification environment for verifying operation of the transmit path of an input/output device, the verification environment comprising:
 a software model of the device;
 a host configured to transmit data through the device;
 a verification layer configured to model transmission of the data through the device, wherein the verification layer comprises:
  a set of input stream queues configured to receive the data from the host;
  a port queue for each output port of the device, wherein the port queues are populated with tokens representing the data; and
  an algorithm configured to model output of the data from the device; and
 a transmission checker configured to compare output of the device with output modeled by the verification layer.

2. The verification environment of claim 1, wherein said verification layer further comprises:

a call back manager configured to use call backs to signal completion of events associated with processing of the data prior to transmission from the DUT.

3. The verification environment of claim 2, wherein:

the data comprises packet data to be transmitted by the device; and said call back manager generates a call back for each set of packet data to be transmitted, to determine when the set of packet data is available to the device.

4. The verification environment of claim 2, wherein said verification layer further comprises:

a scheduler configured to populate the port queues with the tokens based on resolution of the call backs.

5. The verification environment of claim 1, further comprising:

a host abstraction layer configured to enable the verification layer to communicate with different types of hosts; and a network abstraction layer configured to enable the verification layer to communicate with transmission checkers corresponding to different types of networks.

6. A computer-implemented method of verifying a transmit path of an input/output device, the method comprising:

operating a software model of the device;

operating a verification layer configured to model transmission of data through the device;

operating a host abstraction layer configured to interface the verification layer with a data input source, wherein the verification layer can interact with any of multiple different host abstraction layers;

operating a network abstraction layer configured to interface the verification layer with a data network on which the device is configured to transmit the data, wherein the verification layer can interact with any of multiple different network abstraction layers;

associating call backs with data requests issued to the data input source;

resolving the call backs as the data requests are satisfied;

modeling processing of the data within the device as call backs associated with requests for the data are resolved; and predicting output of the data from the device based on resolution of the call backs.

7. A computer-implemented method of verifying a transmit path of an input/output device, the method comprising:

configuring a verification environment comprising a model of the device, a verification layer for verifying operation of the model and a host for providing input to the device;

requesting data from the host for processing by the device;

generating a call back to determine when the requested data is available from the host;

inputting the data to the device;

generating a token within the verification layer to simulate generation of a packet for the data by the device;

processing the token within the verification layer to determine how the device should order the packet among one or more additional packets; and comparing output of the verification layer with output of the device to determine whether the device ordered the packet correctly.

8. The method of claim 7, further comprising:

maintaining stream queues in the verification layer to mimic input streams to the device.

9. The method of claim 8, further comprising:

operating a scheduler to place a token into one of multiple port queues within the verification layer when a set of data requested from the host and modeled in a stream queue is available to the device;

wherein availability of the data is determined by successful resolution of a call back associated with a request for the set of data.

10. The method of claim 7, wherein said processing the token within the verification layer comprises executing an algorithm to service the port queues in the same order as the device.

11. The method of claim 7, further comprising:

implementing in the device an initial policy for the processing of data into packets by the device;

modeling the initial policy within the verification layer;

identifying a replacement policy; and dynamically replacing the initial policy with the replacement policy without halting the verification.

12. A computer readable medium storing instructions that, when executed by a computer, cause the computer to perform a method of verifying a transmit path of an input/output device, the method comprising:

configuring a verification environment comprising a model of the device, a verification layer for verifying operation of the model and a host for providing input to the device;

requesting data from the host for processing by the device;

generating a call back to determine when the requested data is available from the host;

inputting the data to the device;

generating a token within the verification layer to simulate generation of a packet for the data by the device;

processing the token within the verification layer to determine how the device should order the packet among one or more additional packets; and comparing output of the verification layer with output of the device to determine whether the device ordered the packet correctly.

* * * * *